INVENTOR.
HEINZ BRACHVOGEL

 …

United States Patent Office 3,552,820
Patented Jan. 5, 1971

3,552,820
PANORAMIC VIEW OBJECTIVE USING AN ASPHERICAL LENS
Heinz Brachvogel, 5445 Eggenwil, Aargau, Switzerland
Filed May 29, 1967, Ser. No. 642,044
Claims priority, application Switzerland, June 1, 1966, 7,954/66
Int. Cl. G02b *13/06*
U.S. Cl. 350—21
12 Claims

ABSTRACT OF THE DISCLOSURE

A panoramic view objective comprised of a compound lens arrangement in a lens housing with an aspherical lens providing the entrance surface for light rays into the objective. The aspherical surface of the lens is divided into an outer portion diverging from the apex of the lens and an inner portion located adjacent the outer portion. Rays are refracted by the outer portion into the lens and are totally reflected by the inner surface of the inner portion and are oriented to pass through the lens housing. Within the housing an achromatic adjusting lens is positioned adjacent the surface of the aspherical lens and an intermediate image plane is disposed within the housing between the achromatic adjusting lens and an adjacent field lens. The field lens has a focal length greater than the distance between it and the image plane. Adjacent the field lens on the opposite side from the intermediate image plane is a plate member having conically-shaped spaced parallel faces for orienting the rays in a parallel arrangement and directing them toward the optical axis of the lens housing. Rearwardly of the parallel plate an asymmetrical arrangement of lenses in combination with an aperture are provided for collecting and producing the image in an image plane adjacent the rearward end of the lens housing.

SUMMARY OF THE INVENTION

The present invention concerns a panoramic view objective and, more particularly, such an objective employing an aspherical lens for receiving and directing light rays through the objective.

There are many presently known panoramic view optical arrangements which use lenses or mirrors whose surfaces have either a spherical or a toroidal-shape. Within narrow limits, it has also been known to use conical mirrors.

Recently, in German Pat. No. 1,135,677, an aspherical panoramic optical arrangement has been described which permits a full 360° panoramic view. The optical arrangement in this patent discloses only one refracting surface which is surrounded by air. A portion of its surface provides a reflecting surface. This reflecting surface functions as an optically effective section. The image plane of this optical arrangement is located on a plane surface in a lower region of the arrangement.

Utilization of this particular optical arrangement has shown that it contains disadvantages which detract from its practical usability. The disadvantages are particularly noted in the reflecting surface where the border line between the reflecting surface and the refracting surface cannot be made sufficiently definite. Additionally, a serious lack of clearness has been noted in the border of the image.

Further, the reflecting surface is such that it cannot be sufficiently protected for practical use of the arrangement, both in transporting and in cleaning the reflecting surface it may be damaged which will render the arrangement unusable.

The body of this optical arrangement is made of a single glass member. Because of its construction, the elimination of chromatic deficiencies can never be completely attained, so that additional measures are needed to assure their elimination.

One of the most disadvantageous characteristics of this arrangement is the "dead zone" at the center of the panoramic annular image which results from the fact that its own position, the nadir of the image, cannot be reached from the vertical picture-taking angle. The "dead zone" takes a considerable portion of the image and, as a result, it does not provide a complete showing.

In the present invention, the panoramic view objective eliminates all of the deficiencies listed above and, accordingly, is equally well suited for taking pictures and for projecting images.

The improvement provided in the panoramic view objective affords a new corrected form of front lens. The surface of the front lens, which is aspherical, is a curve of a conical section, and is preferably paraboloidal in shape. However, other curved conical sections may be used to provide the aspherical surface for certain purposes, for example, in taking pictures of the interior of a hollow spherical object.

In choosing the glass to be used for the front lens, the requirement for the refraction of the rays by the upper portion of its aspherical surface, adjacent the apex of the lens, must be considered. After the rays have been refracted within the lens, they impinge on the inside surface of the front lens about its lower portion which, due to its total reflecting ability, continues the rays in a downward direction through the lenses of the objective. In this arrangemnet, the mirrored reflection takes place within the lens and not on its exterior surface. Because of this arrangement, the lens has a continuously blank outer surface which, for all practical purposes, can be cleaned at any time without difficulty and without causing any problems in the formation of the image by the lens.

In the front lens of the objective, the boundary between its outer portion which provides the refracting action for entering rays and the inner portion which supplies the total reflecting action is determined by the curvature of the lens and the refraction index of the glass used, these two characteristics adjust themselves optically. Because of these characteristics, the manufacturing of the lens and any further processing required is considerably simplified. In the front lens, after the rays have been reflected along the lens housing, they pass from the front lens into an open space where they form an intermediate image on an image plane. Prior to reaching the image plane, however, the rays pass through a meniscus lens which provides the necessary achromatic adjustment by distinguishing between the Nu value of the glass in the meniscus lens and that in the lens having the aspherical surface. The meniscus lens is cemented to the adjacent face of the front lens and it comprises two surfaces which are positive in relation to the direction of the light passing from the front lens.

The image plane affording a real intermediate image is located in an air space disposed rearwardly of the combined front lens and meniscus lens. Accordingly, the objective may be used for projection. Any heat effect which is created in the image plane during projection, however, cannot exert any undesired effects on the optical members in the objective.

Behind the image plane there is an achromatic lens combination which acts as a field lens and transmits the rays to a plate member which has relatively flat, conically-shaped parallel spaced, symmetrical faces. It is this novel plate member which eliminates the "dead zone" which appears in the center of the intermediate image plane located between the front lens and the field lens. Because of this member, the previously "dead zone" section of the image becomes visible. The correction effect provided by the plate member is obtained by the position of its relatively flat conically-shaped surfaces which are arranged obliquely to the optical axis of the objective. Due to the arrangement of the plate member faces, the rays are displaced in parallel arrangements and are directed toward the optical axis passing inwardly from the upper to the lower faces of the plate member. The thickness of the plate established in accordance with the reflection index of the glass, is determined so that the annular "dead zone" in the intermediate image plane is compressed to a diminishing point in the final image plane, which diminishing point is disposed on the optical axis of the lens system. Following the plate member in the lens housing are a series of lenses and an aperture which provides the required formulation of the image in the final image plane.

The image produced by the optical arrangement of the present invention affords a circular image of a 360° panoramic extent, the nadir point being located in its center, and the previously known central "dead zone" is eliminated and, accordingly, the maximum content is provided in the image.

Since a complete panoramic image is provided by the present invention, it is particularly advantageous for use in projection where the paths of the rays are reversed through the optical arrangement. Because all the rays passing through the objective are available, particularly those close to the axis, there is no loss of content in the image.

The primary object of the invention is to provide an arrangement of lenses including an aspherical lens to afford a panoramic view affording a full 360° content of the object.

Another object of the present invention is to provide an efficient and effective arrangement of lenses which does away with the "dead zone" previously known in the art and provides a complete 360° coverage of the object viewed by the objective.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
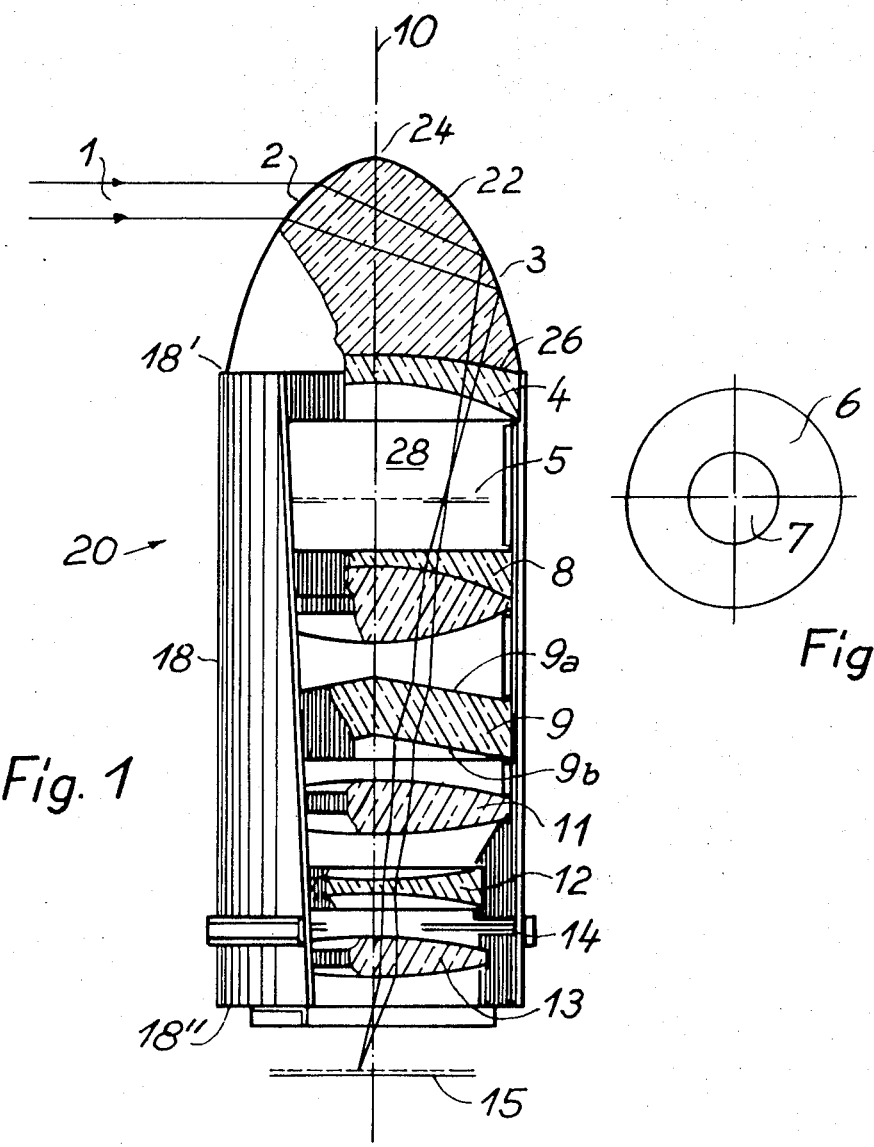
FIG. 1 is a side view, partly in section, of a preferred embodiment of the present invention.

In FIG. 1, a panoramic view objective 20 is shown with a lens housing 18 having a first or front end 18′ and a second or rear end 18″. The optical axis 10 of the objective 20 extends centrally through the lens housing 18. Concentrically disposed about the optical axis 10 is a front lens 22 having an outwardly directed aspherical surface formed by an outer part 2 and an inner part 3. The outer part 2 extends from the apex 24 of the lens toward the first end 18′ of the housing 10 to a point where it meets the inner part of the aspherical surface. The boundary between these two parts of the aspherical surface is dependent upon the curvature of the surface, which is generally paraboloidal, and the refraction index of the glass used in the lens. The surfaces 26 of the front lens directed rearwardly within the lens housing is concave in shape.

Figure 2:
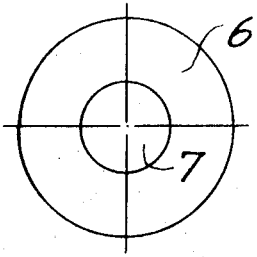
FIG. 2 is a view of an intermediate image plane located within the embodiment shown in FIG. 1.

Immediately adjacent the surface 26 of the front lens in a meniscus lens 4 having a concave surface which is cemented to the surface 26 of the front lens and a convex surface which is directed rearwardly within the lens barrel. The meniscus lens 4 provides an achromatic adjustment for rays passing from the front lens into the housing 18. Spaced from the meniscus lens 4 is a compound lens arrangement 8 which acts as a field lens providing additional achromatic adjustment. The space between the meniscus lens 4 and the combination lens 8 provides an open space 28 which contains an intermediate image plane 5 in which the image surface 6 has an annular configuration with a "dead zone" 7 centered within it, see FIG. 2. The image provided in the plane 5 has a full panoramic content of 360°. The combination lens 8 has a focal length which is greater than the distance between it and the intermediate image plane.

Spaced from the combination lens 8 is a plate member 9. This plate member 9 has a pair of parallel spaced faces 9a, 9b each of which has a relatively flat conically-shaped surface. The apex of each face 9a, 9b is disposed on the optical axis 10 and each face is symmetrically arranged within the lens housing 18. The parallel faces provide a correction effect which disposes the rays passing through the lens housing in parallel relationship and directs them inwardly toward the optical axis so that when the rays are arranged in the image plane at the second end of the lens housing, the "dead zone" is no longer apparent.

For the image producing optical members, FIG. 1 shows a series of three lenses 11, 12 and 13 which provide a asymmetrical combinations. The lens 11 has a pair of convex faces as does lens 13 while the lens 12 positioned between them has a pair of concave faces. Positioned between the lenses 12 and 13 is aperture 14 which provides the proper collection of the rays onto the image plane 15 located rearwardly of the second end 18″ of the housing 18.

Figure 3:
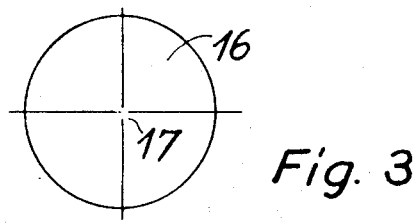
FIG. 3 is a view of the final image plane located at the lower end of the embodiment shown in FIG. 1.

The final range 16 obtained by using the objective 20 affords a full panoramic view of 360° content see FIG. 3. While the "dead zone" 7 appeared in the intermediate image plane 5, due to the use of the plate member 9 it has been eliminated in the final image plane 16. In FIG. 3, it will be noted that the extent of the "dead zone" is limited to that shown by the point 17 on the optical axis 10.

In FIG. 1, a pair of light rays 1 are shown passing into the first lens 22 through the outer part 2 of its aspherical surface. Due to refraction, the rays 1 are bent downwardly and are totally reflected by the inner surface of the inner part 3 of the aspherical surface passing downwardly through the lens housing 18. The rays extend through the intermediate image plane 5 which has a "dead zone" 7. An achromatic adjustment is made by the meniscus lens 4 and the combination lens 8 located behind the intermediate image plane.

After passing through the combination lens 8, the rays enter the plate member 9 wherein they are arranged in parallel relationship and are disposed in the direction of the optical axis 10. Next the rays 1 pass through the lens 11, 12 and 13 and aperture 14 which forms the rays into the image in plane 15. The plate member 9 provides the correction for diminishing the "dead zone" 7 from the intermediate image 5 to the point 17 in the final image plane 15.

Though only one embodiment has been illustrated and described, the basic arrangement of the present invention could be applied to various panoramic view objectives.

While a specific embodiment of the invention has been shown and described in detail to illustrate the application of the inventive principles, it will be understood that the invention may be embodied otherwise without departing from such principles.

What is claimed is:

1. A panoramic view objective for use in photography and in projecting images and which affords a circular image of 360° panoramic extent while eliminating any central dead zone in the image, comprising a lens housing having a first end and a second end and the optical axis of the objective passing through said housing, a front lens positioned in the first end of and extending outwardly from said housing, said front lens having an aspherical first surface directed outwardly from the first end of said housing with its apex disposed on the optical axis of the objective, said aspherical surface being a continuous surface of revolution composed of a first convex part extending from the apex to a plane transverse to the optical axis and a second part extending from the end of said first part at the transverse plane in the direction of the second end of said housing for the remainder of said aspherical surface, the first part of said aspherical surface having a converging refracting effect on rays passing therethrough into said front lens, the interior of said second part of said aspherical surface providing a total reflecting converging effect for rays refracted through the first part of said aspherical surface, said front lens having a second surface directed toward the second end of said barrel, first lens means disposed adjacent the second surface of said front lens for adjusting the achromatic effect of the rays received from said front lens, and second lens means positioned within said housing and spaced from said achromatic adjusting first lens means in the direction of the second end of said housing and providing an air space therebetween wherein an annular closed panoramic image plane having a centered dead zone is formed by the rays entering through said aspherical first surface, said second lens means disposed within said lens housing forming an ultimate image plane adjacent the second end of said housing and providing a 360° panoramic image content in the image plane without any dead zone.

2. A panoramic view objective, as set forth in claim 1, wherein said front lens has a concave second surface.

3. A panoramic view objective, as set forth in claim 2, wherein said first lens means comprises a meniscus lens having its convex surface contacting the second surface of said front lens and its concave surface directed toward the second end of said housing.

4. A panoramic view objective, as set forth in claim 3, wherein said menisus lens is cemented to the second surface of said front lens.

5. A panoramic view objective, as set forth in claim 1, wherein the aspherical surface of said front lens has a paraboloidal configuration.

6. A panoramic view objective, as set forth in claim 1, wherein said second lens means comprises a field lens positioned adjacent to and spaced from said achromatic adjusting first lens means and defining therebetween the air space wherein the annular closed panoramic image plane is formed.

7. A panoramic view objective, as set forth in claim 6, wherein said second lens means comprises an optical refractor plate member located in said housing between its second end and said field lens, said plate member having a pair of axially spaced conically shaped parallel faces for arranging the rays passing through the housing into parallel relationship and disposing them in the direction of the optical axis.

8. A panoramic view objective, as set forth in claim 7, wherein said plate member has the apices of its conically-shaped faces located on the optical axis through said housing.

9. A panoramic view objective, as set forth in claim 8, wherein said second lens means comprises a compound lens arrangement disposed within said housing between said optical refractor plate member and the second end thereof and is comprised of a plurality of achromatic lenses.

10. A panoramic view objective, as set forth in claim 6, wherein said field lens comprises a compound lens having a focal length greater than the distance from said field lens to the image plane disposed within the air space between said field lens and said meniscus lens.

11. A panoramic view objective, as set forth in claim 9, wherein said compound lens arrangement comprises an asymmetrical combination of three spaced lenses.

12. A panoramic view objective, as set forth in claim 11, wherein means forming an aperture is disposed about the optical axis and is positioned between a pair of lenses in said asymmetrical combination of lenses.

References Cited

UNITED STATES PATENTS

| | | | |
|---|---|---|---|
| 2,759,393 | 8/1956 | McLeod | 350—189 |
| 2,821,107 | 1/1958 | Bouwers | 350—200 |
| 2,882,784 | 4/1959 | Toffolo | 350—189 |
| 3,068,752 | 12/1962 | Bonnell | 350—198 |
| 2,740,318 | 4/1956 | Sharp | 350—198 |

FOREIGN PATENTS

| | | | |
|---|---|---|---|
| 283,493 | 1914 | Germany | 350—198 |
| 1,135,677 | 1962 | Germany | 350—198 |

DAVID SCHONBERG, Primary Examiner

M. J. TAKAR, Assistant Examiner

U.S. Cl. X.R.

350—27, 189, 198, 200, 216